(12) United States Patent
Nakayama et al.

(10) Patent No.: US 8,947,443 B2
(45) Date of Patent: Feb. 3, 2015

(54) INFORMATION PROCESSING APPARATUS AND INFORMATION PROCESSING METHOD

(75) Inventors: Keiichi Nakayama, Nagano (JP); Fukukyo Sudo, Nagano (JP)

(73) Assignee: Sony Corporation, Tokyo (JP)

( * ) Notice: Subject to any disclaimer, the term of this patent is extended or adjusted under 35 U.S.C. 154(b) by 267 days.

(21) Appl. No.: 13/484,617

(22) Filed: May 31, 2012

(65) Prior Publication Data

US 2012/0313952 A1    Dec. 13, 2012

(30) Foreign Application Priority Data

Jun. 9, 2011    (JP) .................. 2011-129191

(51) Int. Cl.
G06F 15/16    (2006.01)
G09G 5/36    (2006.01)

(52) U.S. Cl.
CPC .......... *G09G 5/363* (2013.01); *G09G 2330/021* (2013.01); *G09G 2360/06* (2013.01)
USPC ....................................... 345/502

(58) Field of Classification Search
CPC .................................................... G06F 1/3234
USPC ........................................................ 345/502
See application file for complete search history.

(56) References Cited

U.S. PATENT DOCUMENTS

| 2004/0085322 | A1 | 5/2004 | Alcorn et al. | |
| 2005/0041031 | A1 | 2/2005 | Diard | |
| 2007/0171230 | A1 | 7/2007 | Iwase et al. | |
| 2009/0295794 | A1* | 12/2009 | Fan et al. | 345/419 |
| 2010/0007667 | A1 | 1/2010 | Kawata et al. | |
| 2010/0164964 | A1* | 7/2010 | Sakariya et al. | 345/505 |
| 2010/0332799 | A1 | 12/2010 | Sonobe | |

FOREIGN PATENT DOCUMENTS

| EP | 2079015 A1 | 7/2009 |
| JP | 11-353495 A | 12/1999 |
| JP | 2007-179225 A | 7/2007 |
| JP | 2010-020596 A | 1/2010 |
| WO | 2009038902 A1 | 3/2009 |

OTHER PUBLICATIONS

European Search Report EP 12163867, dated Oct. 19, 2012.
Byeong-Gyu Nam et al: "Cost-effective low-power graphics processing unit for handheld devices [integrated circuits for communications]", IEEE Communications Magazine, IEEE Service Center, Piscataway, US, vol. 46, No. 4, Apr. 1, 2008, pp. 152-159, XP 011206964.

* cited by examiner

*Primary Examiner* — Maurice L McDowell, Jr.
*Assistant Examiner* — Kyle Zhai
(74) *Attorney, Agent, or Firm* — Sony Corporation (57) ABSTRACT

Disclosed herein is an information processing apparatus including: a first drawing processing block configured to generate a video signal by executing predetermined signal processing on entered image data; a second drawing processing block having a higher drawing processing power than the first drawing processing block and being configured to generate a video signal by executing predetermined signal processing on entered image data; a workload measuring block configured to measure at least one of a workload in the first drawing processing block and a workload in the second drawing processing block; a storage block configured to store an application; and a control block configured to select the first drawing processing block or the second drawing processing block to execute the application read from the storage block, on the basis of at least one of the measured workload in the first drawing processing block and the second drawing processing block.

10 Claims, 9 Drawing Sheets

INFORMATION PROCESSING APPARATUS AND INFORMATION PROCESSING METHOD

CROSS-REFERENCE TO RELATED APPLICATION

The present application claims priority from Japanese Patent Application No. JP 2011-129191 filed in the Japanese Patent Office on Jun. 9, 2011, the entire content of which is incorporated herein by reference.

The present disclosure relates to an information processing apparatus and an information processing method and, more particularly, to technologies of dynamically switching between two or more graphics controllers having different drawing processing powers.

Recently, more and more information processing apparatuses such as personal computers for example, have GPUs (Graphics Processing Units) that are graphics controllers dedicated to graphics processing. The GPUs are divided into a GPU (hereafter referred to as an internal GPU or an iGPU) built in a CPU (Central Processing Unit) or a chip set and a GPU (hereafter referred to as a detachable GPU or a dGPU) mounted on an external graphics card.

The detachable GPU has a characteristic that the detachable GPU has a high drawing processing power at the cost of a high power dissipation. The internal GPU has a characteristic that the internal GPU has, compared to the detachable GPU, a lower drawing processing power and a lower power dissipation. For this reason, the realization of technologies for selectively switching between the iGPU and the dGPU depending on the types of applications to be executed on information processing apparatuses and the purposes of uses such as home use and outside-the-home use, for example.

For example, Japanese Patent Laid-open No. 2007-179225 (hereinafter referred to as Patent Document 1) discloses a technology of selecting, with a switch, between a mode of drawing processing by use of the detachable GPU and a mode of drawing processing by use of the internal GPU. Japanese Patent Laid-open No. 2010-20596 (hereinafter referred to as Patent Document 2) discloses a technology of selecting between the mode of drawing processing by use of the detachable GPU and the mode of drawing processing by use of the internal GPU without restarting an OS (Operating System).

SUMMARY

It should be noted here that, in the technologies described in Patent Document 1 and Patent Document 2 above, the relation between the applications and the GPUs that execute these applications is statistically set beforehand; therefore each application is executed by the GPU related therewith beforehand. Consequently, if the user launches two or more applications related with the detachable GPU, for example, each of these applications is executed by the detachable GPU. To be more specific, if the detachable GPU is overloaded while the internal GPU is idle, the internal GPU is not used to mitigate the load of the detachable GPU. If such a situation takes place, only the detachable GPU is highly loaded, so that the inherent processing power of the detachable GPU cannot be made the most of, at the same time leading to a fairy high power consumption.

If, in the above-mentioned situation, two or more applications can be executed by the internal GPU, then the workloads of the internal GPU and the detachable GPU can be distributed. If the workloads over the two GPUs are distributed, then the lowering of the processing efficiency (including the drawing processing power and the power dissipation efficiency) of information processing apparatuses can be avoided. In order to realize this workload distribution, the development of technologies of dynamically switching between two or more GPUs having different drawing processing powers have been demanded.

Therefore, the present disclosure addresses the above-identified and other problems associated with related-art methods and apparatuses and solves the addressed problems by providing an information processing apparatus and an information processing method that are configured to dynamically switch between two or more graphics controllers (or GPUs) having different drawing processing powers.

In order to solve the above-mentioned problems, an information processing apparatus disclosed herein is configured to have a first drawing processing block, a second drawing processing block, a workload measuring block, a storage block, and a control block. The configurations and functions of these component blocks are as follows. The first drawing processing block generates a video signal by executing predetermined signal processing on entered image data. The second drawing processing block has a higher drawing processing power than that of the first drawing processing block and generates a video signal by executing predetermined signal processing on entered image data. The workload measuring block measures a workload in the first drawing processing block and/or a workload in the second drawing processing block. The storage block stores applications. The control block determines whether an application read from the storage block is an application that requires the drawing processing by the first drawing processing block or the second drawing processing block. If the application is found to require the drawing processing by the first drawing processing block or the second drawing processing block, then selects any one of the first drawing processing block and the second drawing processing block as the processing block on which the application is executed on the basis of the information about the measured workload in the first drawing processing block measured by the workload measuring block and/or the measured workload in the second drawing processing block measured by the workload measuring block.

In addition, in order to solve the above-mentioned problems, an information processing method disclosed herein executes processing as follows. First, an application is stored. Next, a workload in a first drawing processing block and/or a workload in a second drawing processing block is measured. The first drawing processing block generates a video signal by executing predetermined signal processing on entered image data. The second drawing processing block has a higher drawing processing power than that of the first drawing processing block and generates a video signal by executing predetermined signal processing on entered image data. Then, if the application is an application that requires the drawing processing by the first drawing processing block or the second drawing processing block, one of the first drawing processing block and the second drawing processing block is selected as the drawing processing block in which the application is executed, on the basis of the information about the measured workload in the first drawing processing block and/or the measured workload in the second drawing processing block.

According to the configuration and processing described above, one of the first drawing processing block and the second drawing processing block, whichever has a lower workload is automatically selected as the drawing processing block on which an application is executed.

According to the information processing apparatus and information processing method disclosed herein, two or more graphics controllers (GPUs) having different drawing processing powers can be dynamically switched between. Consequently, the saving of power dissipation of information processing apparatuses and/or efficient drawing processing can be realized.

BRIEF DESCRIPTION OF THE DRAWINGS

Other features and advantages of the disclosure will become apparent from the following description of embodiments with reference to the accompanying drawings in which.

DETAILED DESCRIPTION OF THE PREFERRED EMBODIMENTS

The following describes the information processing apparatuses and information processing methods in further detail by way of embodiments thereof with reference to the accompanying drawings in the following order, provided that the disclosures hereof are not limited to the information processing apparatuses and information processing method to be described below:

(1) First embodiment (an example in which the GPUs that execute applications are switched between depending on the workload states of the GPUs);

(2) Second embodiment (an example in which the GPUs that execute applications are switched between depending on an operation mode in which the information processing apparatus operates);

(3) Third embodiment (an example in which the GPUs that execute applications are switched between depending on the preset categories of applications); and (4) Variations to the third embodiment (an example in which the GPUs on which newly installed applications are executed are switched between on the basis of application characteristics information).

1. First Embodiment

[1-1. An Exemplary Configuration of the Information Processing Apparatus]

Figure 1:
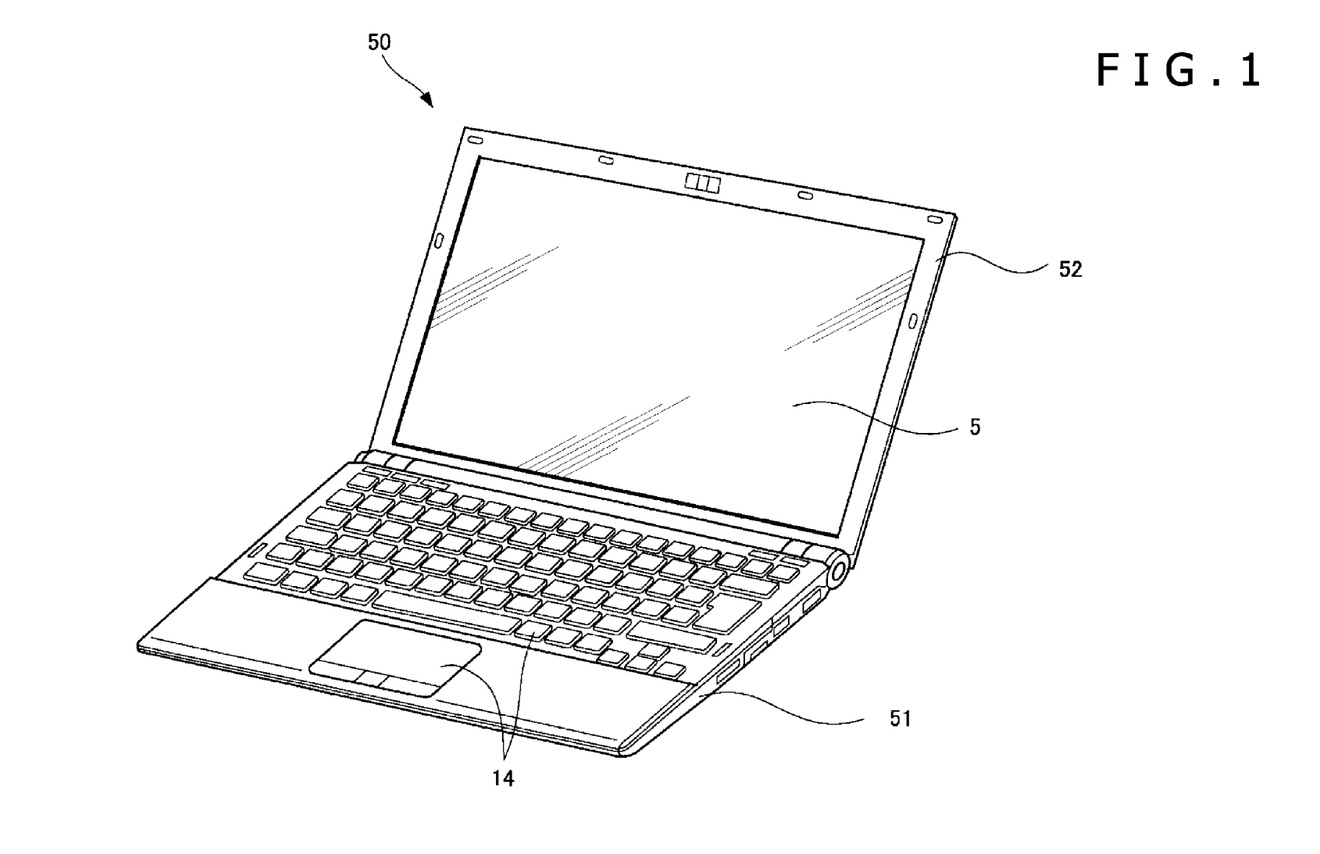
FIG. 1 is a perspective view illustrating an exemplary configuration of an information processing apparatus practiced as an embodiment of the present disclosure.
Figure 2:
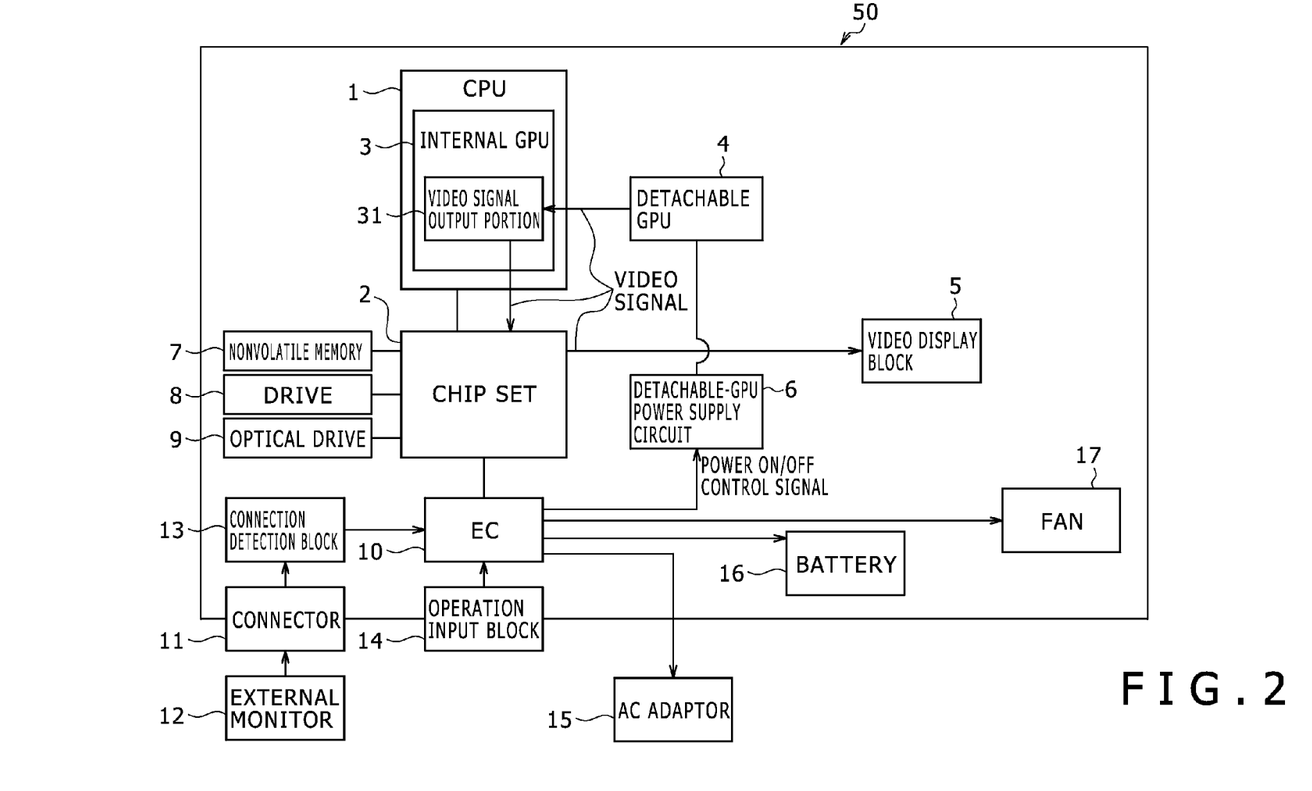
FIG. 2 is a block diagram illustrating an exemplary internal configuration of an information processing apparatus practiced as a first embodiment of the disclosure.

First, an exemplary configuration of the information processing apparatus practiced as the first embodiment of the disclosure will be described with reference to FIG. 1 and FIG. 2. FIG. 1 shows an external view indicative of an exemplary configuration of the information processing apparatus. FIG. 2 is a block diagram illustrating an exemplary internal configuration of the information processing apparatus. Herein, the description is made by use of an example in which the information processing apparatus is applied to a note-size PC (Personal Computer). It should be noted that the configuration shown in FIG. 1 is common to all the embodiments to be described below.

As shown in FIG. 1, a note-size PC 50 is made up of a main frame 51 and a display unit 52. The main frame 51 has a housing of a thin box, on top of which an operation input block 14 and so on made up of a keyboard, a touch panel, and so on are arranged, for example. In the display unit 52, a video display block 5 based on an LCD (Liquid Crystal Panel) or an organic EL (Electro Luminescence), for example, is built. The display unit 52 is attached to the main frame 51 pivotably between an open position and a closed position relative to the main frame 51.

It should be noted that a detachable GPU 4 to be described later is mounted on the note-size PC 50 by being loaded into a slot arranged in the main frame 51, for example. The slot into which the detachable GPU 4 is loaded may be a general-purpose slot arranged on the main frame 51 or a slot dedicated to GPU addition. Alternatively, the detachable GPU 4 may be connected to the note-size PC 50 via a general-purpose serial bus port arranged on the note-size PC 50.

The following describes an exemplary internal configuration of the note-size PC 50 practiced as the first embodiment of the disclosure with reference to FIG. 2. The note-size PC 50 has a CPU (Central Processing Unit) 1 and a chip set 2. The CPU 1 is a control block configured to control the other components of the note-size PC 50. To be more specific, the CPU 1 executes an OS (Operating System) and various applications that are loaded from a drive 8 to be described later into a main memory, not shown.

The CPU 1 contains an internal GPU 3 that functions as a first drawing processing block. In addition, the CPU 1 is connected with the detachable GPU 4 that functions as a second drawing processing block. The internal GPU 3 and the detachable GPU 4 generate video signals by executing drawing processing on the data received from the CPU 1. The video signals generated by the internal GPU 3 and the detachable GPU are entered in a video signal output portion 31 in the internal GPU 3. The video signal output portion 31 executes various image adjustments on each of the entered video signals in order to adapt the video signals to the video display block 5, thereby outputting the image-adjusted video signals to the chip set 2. The chip set 2 outputs the video signals entered from the video signal output portion 31 from a video signal output terminal, not shown, to a video display block 5 or an external monitor 12 to be described later.

It is assumed that, in drawing processing power, the detachable GPU 4 be higher than the internal GPU 3. Therefore, the detachable GPU 4 provides a higher drawing processing power in 3D processing and high-resolution drawing processing, for example. However, because the detachable GPU 4 drives itself and peripheral devices, relatively high power dissipation will result. Therefore, when the detachable GPU 4 is operating, the power load to the entire system of the note-size PC 50 also increases. For this reason, a detachable-GPU power supply circuit 6 is connected to the detachable GPU 4. The detachable GPU 4 operates on the power supplied from the detachable-GPU power supply circuit 6.

The detachable-GPU power supply circuit 6 switches between start and stop of supplying the power to the detachable GPU 4 on the basis of a power ON/OFF signal outputted from an EC (Embedded Controller) 10 to be described later. When the internal GPU 3 is used, the detachable-GPU power supply circuit 6 stops the function of the detachable GPU 4, thereby stopping the power supply to the detachable GPU and periphery devices. This control can hold the power dissipation of the entire note-size PC 50 to a relatively low level. It is also practicable to output, from the chip set 2, the power ON/OFF signal for switching between start and stop of supplying the power to the detachable GPU 4.

The chip set 2 has a connection interface for supporting the connection to each peripheral device, thereby controlling the input/output of data with each peripheral device. The peripheral devices connected to the chip set 2 include a nonvolatile memory 7, the drive 8, an optical drive 9, and the EC 10, for example, that function as storage blocks. The nonvolatile memory 7 is based on ROM (Read Only Memory), EEPROM (Electrically Erasable and Programmable Read Only Memory), or a flush memory, for example. The drive 8 is based on HDD (Hard Disk Drive) or SSD (Solid State Drive), for example, and used as a storage for the note-size PC 50.

The drive 8 stores various applications, which are read by the CPU 1 into a main memory, not shown, to be executed as described above. Of these applications, the drawing processing of the applications that require the drawing processing by the internal GPU 3 or the detachable GPU 4 is executed by the internal GPU 3 or the detachable GPU 4. The information processing apparatus (the note-size PC 50) disclosed herein executes the dynamic selection and assignment of each GPU on which applications are executed, by various techniques as described below in the embodiments of the disclosure.

The optical drive 9 is made up of a DVD (Digital Versatile Disc) drive or a Blu-ray disc drive, for example. The EC 10 is connected with a connection detection block 13 for detecting the connection of the external monitor 12 to a connector 11, an operation input block 14, an AC adaptor 15, a battery 16, a fan 17, and the above-mentioned detachable-GPU power supply circuit 6 and controls these components. To be more specific, the EC 10 has KBC (Keyboard Controller) for controlling the operation input block 14 and the ACPI/EC function for executing power supply management compliant with ACPI (Advanced Configuration and Power Interface) that is a standard associated with power control. In addition, the EC 10 has a shared memory space for transferring data with BIOS (Basic Input/Output System), thereby transferring commands and data with BIOS. BIOS is firmware for executing data input/output processing in the hardware of the information processing apparatus (the note-size PC 50).

Further, depending on the selection between the GPUs, the EC 10 generates a power ON/OFF control signal for switching between the power ON/OFF of the detachable GPU 4 and supplies the generated power ON/OFF control signal to the detachable-GPU power supply circuit 6.

The external monitor 12 may also be connected to the note-size PC 50 herein. the external monitor 12 is a display based on LCD or organic EL, for example, which is connected to the note-size PC 50 via the connector 11 by means of a DVI (Digital Visual Interface) terminal or an HDMI (High-Definition Multimedia Interface) terminal, for example.

The operation input block 14 is made up of a keyboard, a touch pad, and a mouse, for example, generates an operation signal corresponding to an operation done by the user, and supplies the generated operation signal to the EC 10. The AC adaptor 15 converts a commercial alternating-current power into a direct-current power and supplies the direct-current power to the note-size PC 50. The battery 16 is a secondary battery built in the note-size PC 50 and supplies power to each component of the note-size PC 50 in a state where the AC adaptor 15 is not connected to the note-size PC 50.

The fan 17 is a mechanism configured to dissipate the heat generated from the CPU 1 and so on. It should be noted that the EC 10 may control such that the rotation of the fan 17 differs between the case where the internal GPU 3 is selected and the case where the detachable GPU 4 is selected. For example, if the internal GPU 3 is selected, the rotation of the fan 17 may be lowered than that if the detachable GPU 4 is selected. This rotation control allows the further lowering of the power dissipation of the note-size PC 50.

In the present embodiment, "execution" of the internal GPU 3 or the detachable GPU 4 denotes to make one of the GPUs execute drawing processing by controlling the power supply to the GPUs. It is also assumed that the note-size PC 50 have such functions and devices necessary for the operation of the computer as various interfaces including buses and terminals, in addition to the component blocks mentioned above. It should be noted that, in FIG. 2, the configuration between the EC 10 and the peripheral blocks thereof is shown only in a control configuration as viewed from the EC 10; for example, a supply path of video signals to the external monitor 12 and power supply paths from the AC adaptor 15 and the battery 16 are omitted.

[1-2. Exemplary Operation of the Information Processing Apparatus]

Figure 3:
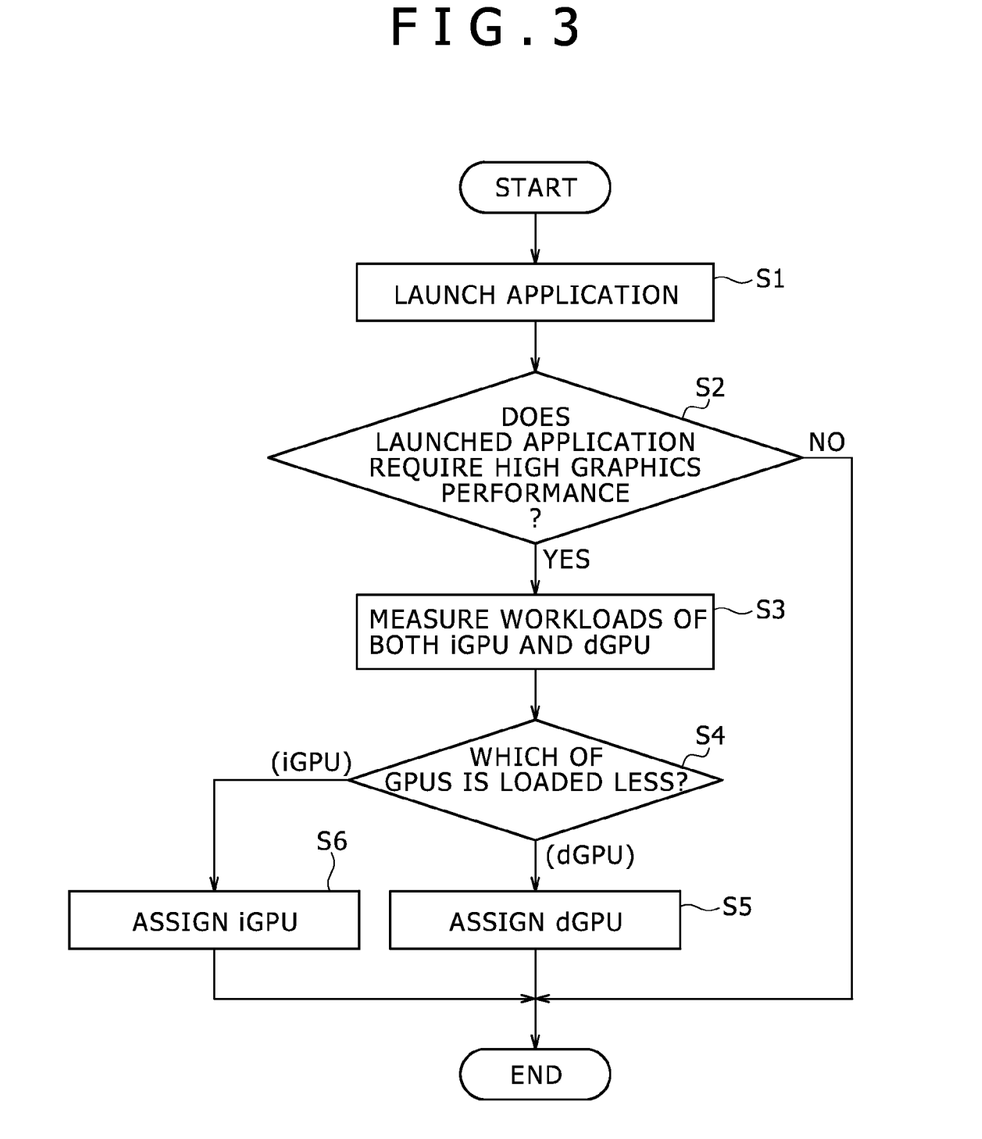
FIG. 3 is a flowchart indicative of an exemplary operation of the information processing apparatus practiced as the first embodiment of the disclosure.

The following describes an operation of the information processing apparatus practiced as the first embodiment of the disclosure with reference to the flowchart shown in FIG. 3. It should be noted that, in the flowchart shown below, the internal GPU 3 is indicated as "iGPU 3" and the detachable GPU 4 is indicated as "dGPU 4."

First, when an application is launched on the basis of an operation done by the user through the operation input block 14 (step S1), the CPU 1 determines whether the launched application requires a high graphics processing performance or not (step S2). If the launched application is found not requiring a GPU power (processing performance), namely, if the launched application is found to be a text editor for example, then "NO" is selected in step S2, upon which the processing comes to an end.

If the launched application is found requiring the power of the GPU, then the CPU 1 that operates as a workload measuring block measures the workloads in the iGPU 3 and dGPU (step S3). The workload of each GPU is measured by the magnitude of the power dissipation in each GPU and the height of the temperature (the junction plane temperature) of the chip junction plane of the semiconductor of each of the iGPU 3 and dGPU 4, for example. It should be noted that, if the actual measurement values of power dissipation and junction plane temperature are the same between the iGPU 3 and the dGPU 4, the magnitudes of workloads of the iGPU 3 and the dGPU 4 are different. Therefore, the actual measurement values are related with the load ratios in advance such that, at the same X degrees centigrade, the workload is 50% for the iGPU 3 and 20% for the dGPU 4, for example, thereby determining the magnitude of workload by load ratio.

Next, the CPU 1 determines the GPU that is lower in workload (step S4). If the magnitude of workload is measured by junction plane temperature, it is possible to determine, as the GPU lower in workload, the GPU having a greater difference between the absolute maximum rating of junction plane temperature and the measured junction plane temperature, for example.

If the GPU lower in workload is found to be the dGPU 4 as a result of the decision made in step S4, then control is executed to assign the dGPU 4 for the GPU for executing the application (step S5). If the workload of the iGPU 3 is found lower, then control is executed to assign the iGPU 3 as the GPU for executing the application (step S6).

According to the first embodiment described above, of the iGPU 3 (the internal GPU 3) and the dGPU 4 (the detachable GPU 4), the one lower in workload is automatically selected for the GPU that executes an application. For example, assume a situation in which a Blu-ray disc is newly reproduced on the optical drive 9 (refer to FIG. 2) with a 3D game already executed by the dGPU 4. In this case, it is expected that the workload of the detachable GPU 4 executing the 3D game be already high, so that the processing of step S6 is executed as a result of the decision of step S4.

Basically, it is desirable for the drawing processing at reproduction of a Blu-ray disc requiring a comparatively high drawing processing power to be executed by the more powerful dGPU 4. However, because the 3D game is already executed by the dGPU 4, reproducing a Blu-ray disc may cause the workload of the detachable GPU 4 to exceed a workload in which stable processing can be executed. In such a case, the application for reproducing a Blu-ray disc launched in step S1 is assigned to the internal GPU 3 that is lower in workload. Namely, the workloads of the internal GPU and the detachable GPU 4 are distributed to enhance the effective performance of each GPU.

2. Second Embodiment

[2-1. Exemplary Configuration of the Information Processing Apparatus]

Figure 4:
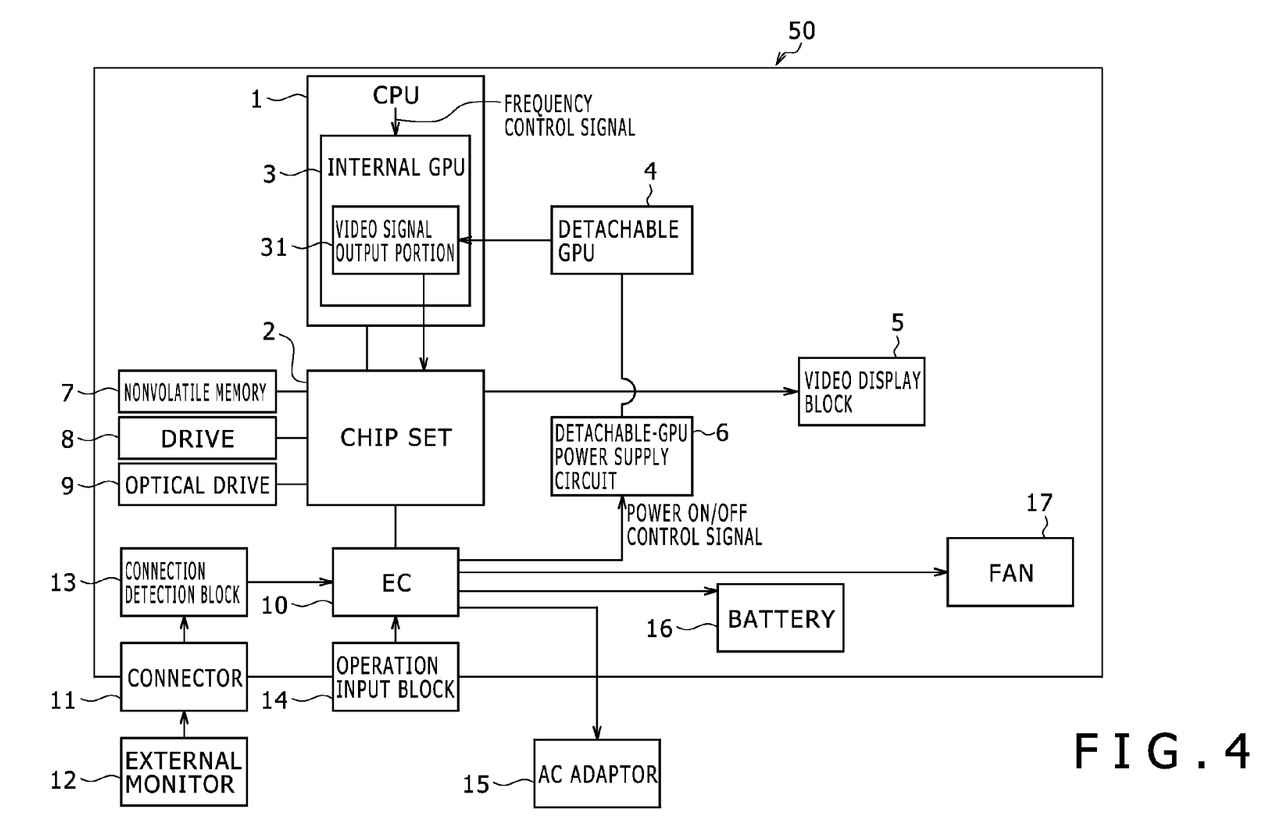
FIG. 4 is a block diagram illustrating an exemplary internal configuration of an information processing apparatus practiced as a second embodiment of the disclosure.

The following describes an exemplary configuration of an information processing apparatus practiced as the second embodiment of the disclosure with reference to the block diagram shown in FIG. 4. With reference to FIG. 4, components similar to those previously described with reference to FIG. 2 are denoted by the same reference numerals and the duplication in the description will be skipped. A difference from the configuration shown in FIG. 2 lies in that, from a CPU 1 to an internal GPU 3, a frequency control signal for controlling an operation clock frequency is supplied. This frequency control signal is an instruction for bringing the operation clock frequency of the internal GPU 3 to less than a predetermined clock. For a control value of the frequency control signal, a minimum frequency for example at which the internal GPU 3 can operate is set. If the frequency control signal having the control value that is this minimum frequency for example is not outputted, the control value is set to an operation clock frequency at which the internal GPU 3 can exert the original power thereof.

Supplying the frequency control signal to the internal GPU 3 is executed in a software approach by arranging a dedicated API (Application Program Interface) for example and through the arranged API. Alternatively, a physical signal pin may be arranged for each integrated circuit making up the internal GPU 3 to apply the frequency control signal to this signal pin.

The frequency control signal is transmitted from the CPU 1 to the internal GPU 3 when the power is being supplied only from the battery 16 or "power save mode" is set. "Power save mode" herein denotes the saving of the power by invalidating, reducing, or simplifying predetermined functions or devices (for example, functions and devices that are comparatively less influenced by the operation of a user computer).

[2-2. Exemplary Operation of the Information Processing Apparatus]

Figure 5:
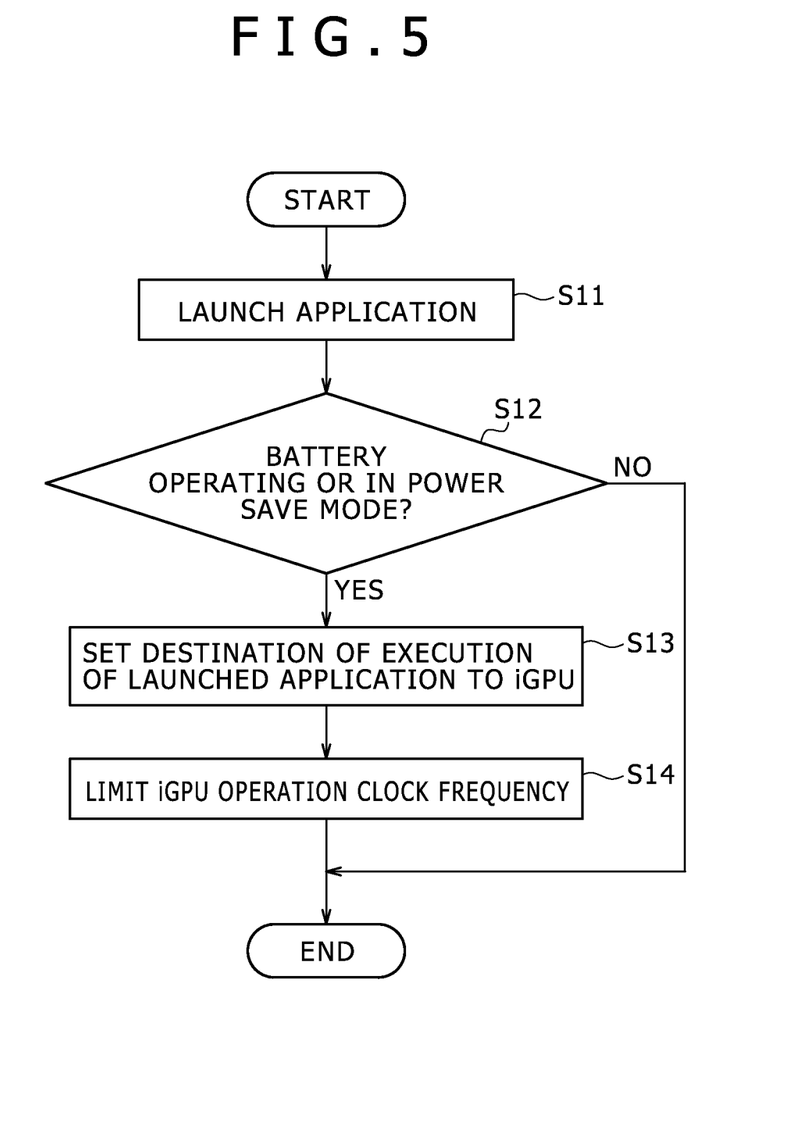
FIG. 5 is a flowchart indicative of an exemplary operation of the information processing apparatus practiced as the second embodiment of the disclosure.

The following describes an exemplary operation of the information processing apparatus practiced as the second embodiment of the disclosure with reference to the flowchart shown in FIG. 5. First, when a new application is launched in response to an operation done by the user through the operation input block 14 (step S11), the CPU 1 determines whether the note-size PC 50 is operating on the battery 16 or in the power save mode (step S12). If the note-size PC 50 is found to be operating neither on the battery 16 nor in the power save mode, then the processing comes to an end. If the note-size PC 50 is found operating on the battery 16 or in the power save mode, then the application newly launched in step S11 is executed by the iGPU 3 (step S13) and a frequency control signal is transmitted to the iGPU 3 to limit the operation clock frequency to less than a predetermined clock (step S14).

According to the second embodiment described above, the newly launched applications requiring the GPU processing power are all executed in the internal GPU 3 while the note-size PC 50 is operating on the battery 16 or in the power save mode. Consequently, in a situation where it is necessary to reduce the power dissipation of the note-size PC 50, the newly launched applications are prevent from being executed by the detachable GPU 4 that is high in power dissipation. Further, controlling the operation frequency of the internal GPU 3 to be held below a predetermined frequency allows the more reduction of the power dissipation.

It should be noted that, in the above-mentioned embodiments, the processing shown in FIG. 5 is executed when the note-size PC 50 is operating on the battery 16 or in the power save mode; however, the present embodiment is not limited thereto. Even if the note-size PC 50 is operating on the battery 16, the processing shown in FIG. 5 may not be executed when the amount of charge of the battery 16 is sufficient (that is, more than a predetermined amount). To be more specific, the control may be varied in accordance with the remaining level of the battery 16.

3. Third Embodiment

[3-1. Exemplary Configuration of the Information Processing Apparatus]

Figure 6:
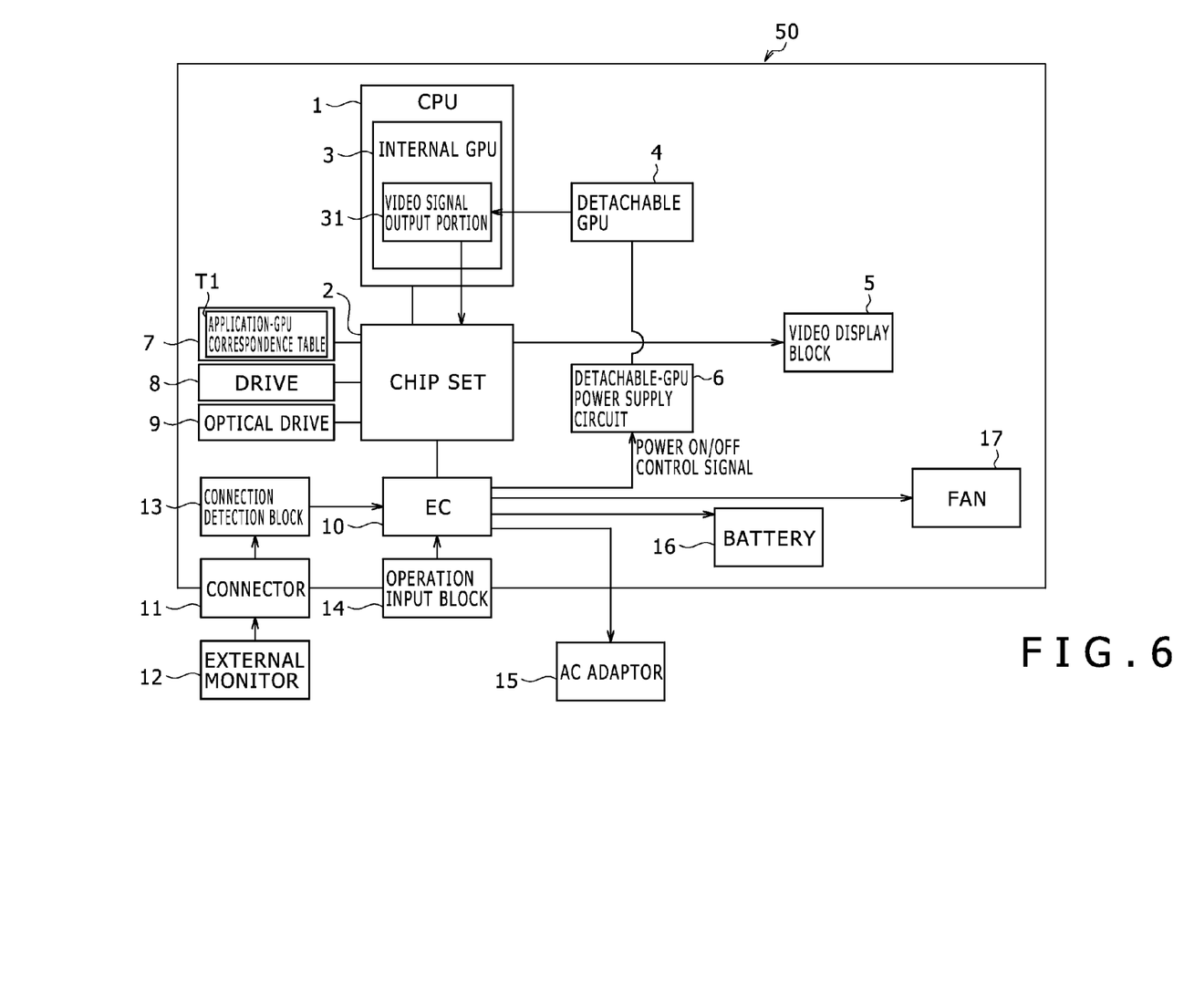
FIG. 6 is a block diagram illustrating an exemplary internal configuration of an information processing apparatus practiced as a third embodiment of the disclosure.

The following describes an exemplary configuration of an information processing apparatus practiced as the third embodiment of the disclosure with reference to the block diagram shown in FIG. 6. With reference to FIG. 6, components previously described with reference to FIG. 2 (and FIG. 4) are denoted by the same reference numerals and the duplicate description will be skipped. A difference from the configuration shown in FIG. 2 lies in that an "application Vs. GPU table T1" indicative of the relation between various applications and the GPUs on which these applications are executed is stored in a nonvolatile memory 7. It should be noted that, in this embodiment, the application Vs. GPU table T1 is stored in the nonvolatile memory 7; however it is not limited to this and it is also practicable to store this table in a drive 8.

With the application Vs. GPU table T1, all applications requiring the GPU processing power among the applications stored in the nonvolatile memory 7 are divided into five categories shown below:

category a: applications required to be executed always on the internal GPU 3;

category b: applications required to be executed always on the detachable GPU 4;

category c: applications desired to be executed on the internal GPU 3;

category d: applications desired to be executed on detachable GPU 4; and category e: applications executable on either GPU.

With "category a" and "category b" as a first category, the GPU on which applications are executed is statically set in advance. These applications which makes the most of the functions unique to the internal GPU 3 or the detachable GPU 4 are put in these categories. In "category a," an application that wirelessly transfers the content stored in the note-size PC 50 or on the Internet to a television receiver and displays the transferred content thereon, for example, is stored. In "category b," a program developed by use of GP GPU (General Purpose computing on GPU), a simulation software program of physical computation system for example, is sorted.

In "category c," "category d," and "category e" as a second category, applications are sorted in accordance with application processing efficiencies in the GPUs. With the applications sorted in the second category, the GPU on which these applications are executed is dynamically selected in accordance with the load situation of the internal GPU 3 or the detachable GPU 4 at the launching of the applications.

In "category c" as the third category, applications for reproducing DVDs (Digital Versatile Disks) and applications for drawing Web flash content are sorted, for example. In "category d" as the fourth category, applications for reproducing 3D games and Blu-ray discs are sorted. In "category e" as the fifth category, 3D reproducing applications that are not heavy in processing are sorted among the 3D game reproducing applications.

[3-2. Exemplary Operation of the Information Processing Apparatus]

Figure 7:
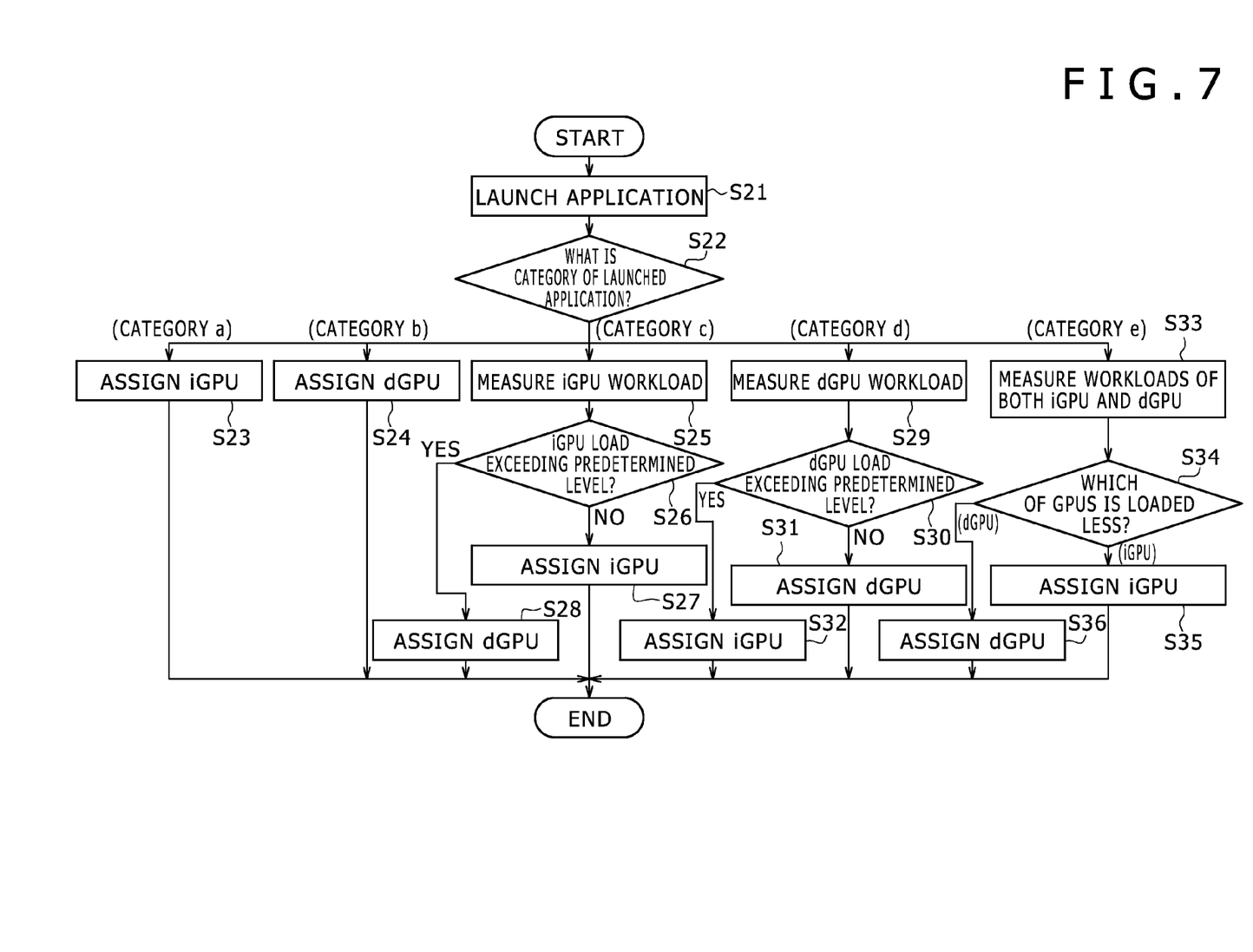
FIG. 7 is a flowchart indicative of an exemplary operation of the information processing apparatus practiced as the third embodiment of the disclosure.

The following describes an exemplary operation of the information processing apparatus practiced as the third embodiment of the disclosure with reference to the flowchart shown in FIG. 7. First, when a new application is launched by an operation done by the user through the operation input block 14 (step S21), then the CPU 1 checks in which category the launched application is sorted (step S22). If the launched application is found to have been sorted in category a, namely, if the launched application is an application statically related with the iGPU 3 (the internal GPU 3), then the iGPU 3 is assigned as the GPU on which this application is executed (step S23). If the launched application is found to have been sorted in category b, namely, if the launched application is an application statically assigned to the dGPU (the detachable GPU 4), then the dGPU is assigned (step S24).

If the launched application is found to have been sorted in category c, namely, if the launched application is an application desired for execution on the iGPU 3, then the CPU 1 measures the workload of the iGPU 3 (step S25). Next, CPU 1 determines whether the measured workload is in excess of a predetermined level or not (step S26). If the measured workload is found to be lower than the predetermined level, then the iGPU 3 is assigned on which the application is executed (step S27). If the measured workload is found to be in excess of the predetermined level, then the dGPU 4 is assigned rather than the iGPU 3 (step S28).

If the launched application is found to have been sorted in category d, namely, if the launched application is an application desired for execution on the dGPU 4, then the CPU 1 first measures the workload of the dGPU 4 (step S29). Next, the CPU 1 determines whether the measured workload is in excess of a predetermined level or not (step S30). If the measured workload is found to be below the predetermined level, then the dGPU 4 is assigned as the GPU on which the application is executed (step S31). If the measured workload is found to be in excess of the predetermined level, then the iGPU 3, rather than the dGPU 4, is assigned as the GPU on which the application is executed (step S32).

If the launched application is found to have been sorted in category e, namely, if the launched application is an application that can be executed either on the iGPU 3 or the dGPU 4, then the CPU 1 measures the workloads of both the iGPU 3 and the dGPU 4 (step S33). Next, the CPU 1 determines which of the iGPU 3 and the dGPU 4 has a lower workload (step S34). If the workload of the iGPU 3 is lower than that of the dGPU 4, the iGPU 3 is assigned (step S35). If the workload of the dGPU 4 is lower than that of the iGPU 3, then the dGPU 4 is assigned (step S36).

It should be noted that the GPU has possibly no room for executing a new application in assigning the GPU in step S28, S32, or S36. If the GPU is found to have no room for executing a new application, it indicates that the power dissipation and/or the junction plane temperature has reached the upper limit thereof, for example. If this happens, the present embodiment is configured to issue an alert message for prompting the user to discontinue the application being executed or delay the launching of a new application.

According to the third embodiment described above, the applications found to have been sorted in "category c" and "category d" are executed on the GPU which is desirable for these applications to be executed on if the workload of such a GPU is lower than a predetermined level. If the workload of the GPU which is desirable for these applications to be executed on is found to be in excess of a predetermined level, then these applications are executed on the other GPU. Applications sorted in "category e" are executed on the internal GPU 3 or the detachable GPU 4 whichever is lower in workload. This prevents a situation in which only one of the GPUs is always selected depending on the types of application to be executed. To be more specific, the workloads of the GPUs are distributed in between, and the execution efficiency of applications executed on the GPUs is enhanced.

It should be noted that, in the present embodiment, the applications sorted in "category a" and "category b" are executed always on the GPUs related in advance in any situation; however, the present embodiment is not limited thereto. For example, in a situation where an operation in the power save mode is required, an application of "category b" related with the execution on the detachable GPU 4 may be executed on the internal GPU 3. However, if this control is executed, the application may not operate correctly in some cases. If such a situation is predicted, the user is noticed in advance that the application may not operate correctly.

Figure 8:
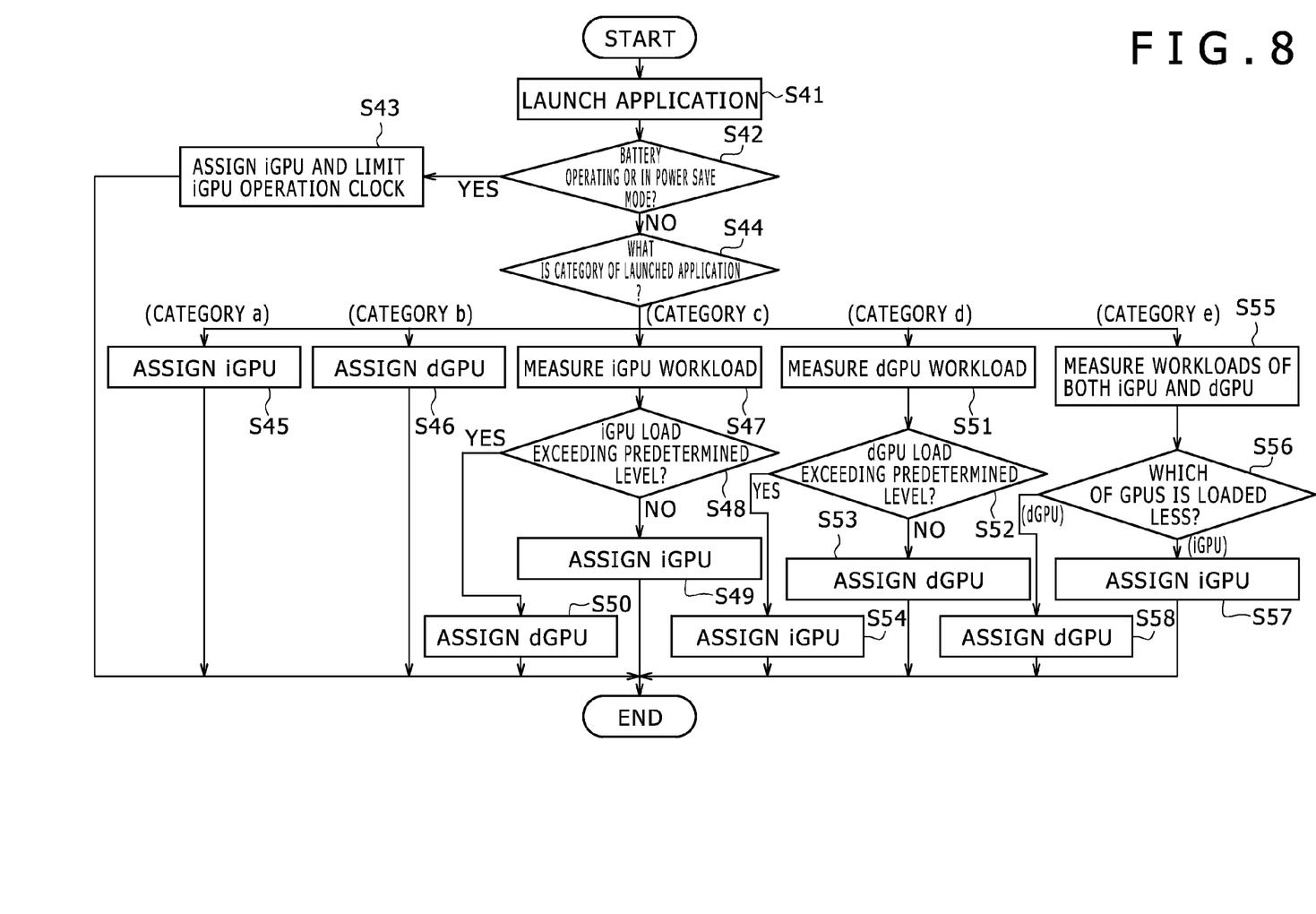
FIG. 8 is a flowchart indicative of another exemplary operation of the information processing apparatus practiced as the third embodiment of the disclosure.

FIG. 8 shows a flowchart indicative of an exemplary operation of the note-size PC 50 to be executed when the above-mentioned processing is executed. First, when a new application is launched by an operation by the user through the operation input block 14 (step S41), the CPU 1 determines whether the note-size PC 50 is operating on the battery 16 or in the power save mode (step S42). If the note-size PC 50 is found to be operating on the battery 16 or in the power save mode, this application is assigned to the iGPU 3 and, at the same time, the operation clock frequency of the iGPU 3 is limited to a level below a predetermined frequency (step S43).

If the note-size PC 50 is found to be operating neither on the battery 16 nor in the power save mode in step S42, then the CPU 1 checks which category the launched application is sorted in (step S44). The processing operations to be executed in subsequent steps S45 through S58 are the same as those of steps S23 through S36 shown in FIG. 7, so that the description thereof will be skipped.

Executing the above-mentioned control processing prevents the application from being executed on the detachable GPU 4 of high power dissipation in a situation where the power dissipation of the note-size PC 50 needs to be held low. Further, by also limiting the operation clock frequency of the internal GPU 3, the power dissipation of the note-size PC 50 can be further held low.

4. Variations to the Third Embodiment

In the third embodiment described above, the applications to be listed in the "application Vs. GPU table T1" have already been installed in the note-size PC 50 (or in the nonvolatile memory 7), for example. However, the third embodiment is not limited thereto. It is also practicable to apply the categories described above every time a new application is installed by the user, thereby switching between the GPUs in accordance with the categories.

Figure 9:
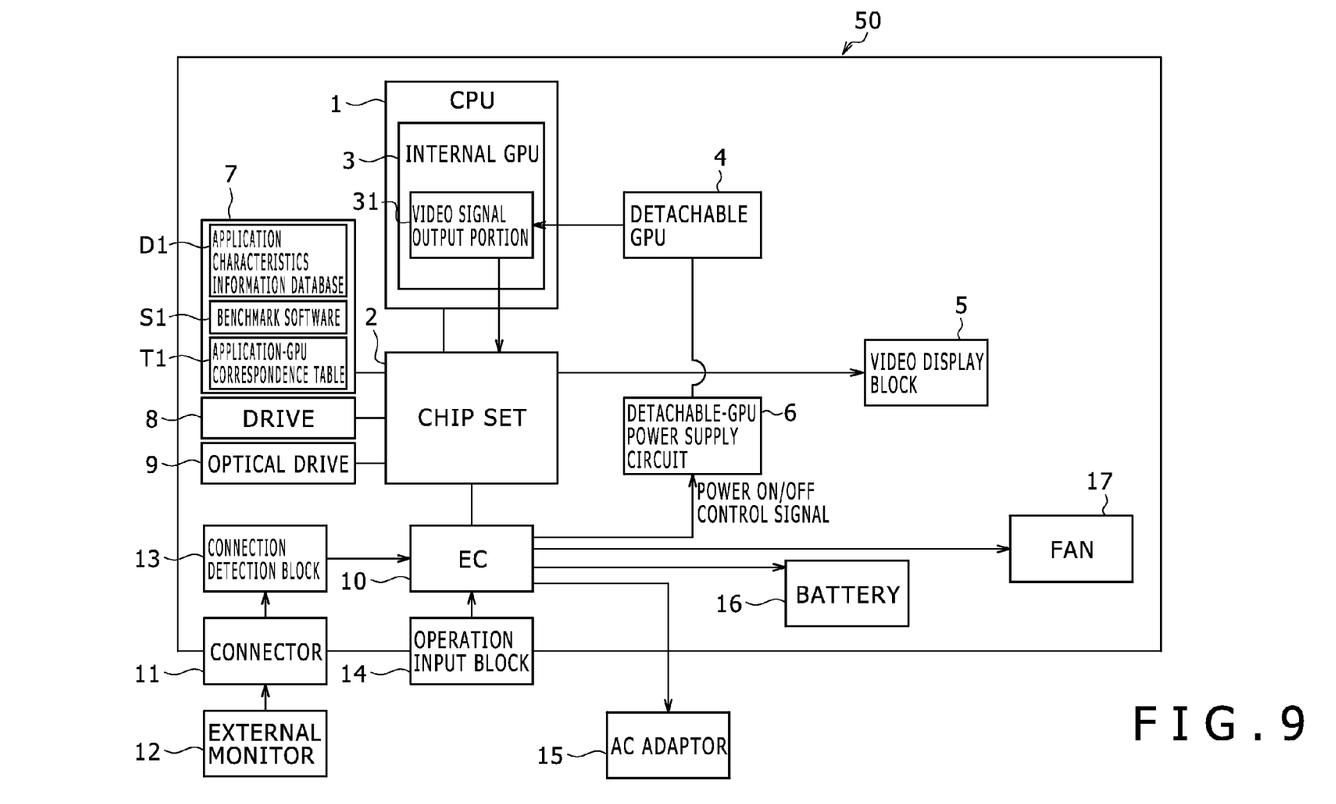
FIG. 9 is a block diagram illustrating an exemplary internal configuration of a variation to the information processing apparatus practiced as the third embodiment of the disclosure.

FIG. 9 shows an exemplary configuration of the note-size PC 50 that is configured as described above. With reference to FIG. 9, components similar to those previously described with reference to FIG. 2 (and FIG. 4 and FIG. 6) are denoted by the same reference numerals and the duplicate description will be skipped. A difference from the configuration shown in FIG. 6 lies in that, the nonvolatile memory 7 further stores an application characteristics information database D1 and a benchmark software program S1. The application characteristics information database D1 stores information about a workload to be applied to each GPU at the execution of an application as application characteristics information.

Information about the workload to be applied to each GPU at the execution of an application can be obtained by executing a predetermined application in a benchmark mode by use of the benchmark software program S1 designed to reproduce a particular load situation. As the results of the benchmark test, the processing powers and power dissipations of the internal GPU 3 and the detachable GPU 4 are stored in the application characteristics information database D1. Then, on the basis of the information stored in this application characteristics information database D1, the application Vs. GPU table T1 described with the third embodiment is configured. Next, on the basis of the categories listed in this application Vs. GPU table T1, the actual assignment of the GPUs is executed.

Carrying out the configuration and the processing as described above allows the execution of not only applications already stored in the nonvolatile memory 7 but also applications newly installed on the note-size PC 50 by the GPU suitable for the characteristics of these applications.

It should be noted that, if the benchmark software program S1 suitable for measuring the workload applied to each GPU at the execution of an application is not installed on the note-size PC 50, then the measuring data obtained while an application is actually being executed may be used. To be more specific, the actual measurement values of the processing powers and power dissipations of the internal GPU 3 and the detachable GPU 4 during the execution of an application may be reflected on the application characteristics information database D1. This configuration provides substantially the same effects as those obtained by the measurement based on the benchmark software program S1.

In another variation, the application characteristics information database D1 may be accumulated in a network server, not shown, for example. In this configuration, before installing a new application, the user downloads the characteristics information of this application from the network server. Then, the user updates the application Vs. GPU table T1 installed on the note-size PC 50 by use of the downloaded characteristics information. Consequently, at the execution of the newly installed application, the GPU suitable for the characteristics of this application is automatically selected on the basis of the information listed on the application Vs. GPU table T1. The application characteristics information database D1 on the network server is constructed by personal computer vendors, application vendors, or given users configured beforehand and the constructed database can be updated by these members from time to time.

Carrying out the configuration and the processing as described above saves the user when installing a new application on the note-size PC 50 to execute this new application in the benchmark mode. To be more specific, the characteristics information of the application downloaded from the network server is added to the application Vs. GPU table T1 and on the basis of the information in this table, the GPU suitable for the characteristics of the installed application can be selected automatically.

In addition, carrying out the configuration and the processing as described above allows the acquisition of the characteristics information of not only newly installed applications but also applications to be installed. Consequently, if the user determines that the performance of a particular application cannot be made most of by the user's note-size PC 50, the user can choose not to install or execute such an application on the user's PC, for example.

It should be noted that the present disclosure can also take the following configuration.

(1) An information processing apparatus including:
a first drawing processing block configured to generate a video signal by executing predetermined signal processing on entered image data;
a second drawing processing block having a higher drawing processing power than a drawing processing power of the first drawing processing block, the second drawing processing block being configured to generate a video signal by executing predetermined signal processing on entered image data;
a workload measuring block configured to measure at least one of a workload in the first drawing processing block and a workload in the second drawing processing block;
a storage block configured to store an application; and
a control block configured to select, if the application read from the storage block requires drawing processing by at least one of the first drawing processing block and the second drawing processing block, any one of the first drawing processing block and the second drawing processing block as the drawing processing block on which the application read from the storage block is executed, on the basis of information about at least one of the workload in the first drawing processing block measured by the workload measuring block and the workload in the second drawing processing block measured by the workload measuring block.

(2) The information processing apparatus according to (1) above, wherein, of the first drawing processing block and the second drawing processing block, the control block selects the drawing processing block lower in the workload measured by the workload measuring block as the drawing processing block on which the application read from the storage block is executed.

(3) The information processing apparatus according to (1) or (2) above, wherein, if a power dissipation of the information processing apparatus is found necessary to be held low, then the control block makes the first drawing processing block execute drawing processing on the application read from the storage block and limits an operation clock frequency of the first drawing processing block to a level below a predetermined frequency.

(4) The information processing apparatus according to any one of (1) through (3) above, wherein the control block determines that the power dissipation of the information processing apparatus is necessary to be held low in one of situations where the information processing apparatus is powered by a secondary battery incorporated in the information processing apparatus and a power save mode for saving the power dissipation of the information processing apparatus is set.

(5) The information processing apparatus according to any one of (1) through (4) above, wherein the workload measuring block determines a magnitude of the workload by at least one of a magnitude of power dissipation of each of the first drawing processing block and the second drawing processing block and a magnitude of a chip junction plane temperature of a semiconductor device constituting each of the first drawing processing block and the second drawing processing block.

(6) The information processing apparatus according to any one of (1) through (5) above, wherein, if the workload measured by the workload measuring block has reached a preset upper limit, the control block outputs at least one of a message prompting termination of the application with which drawing is being executed by at least one of the first drawing processing block and the second drawing processing block and a message prompting deferment of new execution of the application.

(7) The information processing apparatus according to any one of (1) through (6) above, wherein
applications stored in the storage block are divided into a first category in which drawing processing is always executed by predetermined one of the first drawing processing block and the second drawing processing block and a second category in which drawing is executed by one of the first drawing processing block and the second drawing processing block and,
if an application read from the storage block is of the second category, then the control block selects one of the first drawing processing block and the second drawing processing block on which to execute the application.

(8) The information processing apparatus according to (7) above, wherein the second category includes a third category in which drawing processing is executed desirably on the first drawing processing block, a fourth category in which drawing processing is executed desirably on the second drawing processing block, and a fifth category in which drawing processing may be executed on any one of the first drawing processing block and the second drawing processing block.

(9) The information processing apparatus according to (8) above, wherein, if an application read from the storage block is of the third category, the control block measures a workload in the first drawing processing block and, if the workload is below a predetermined level, makes the first drawing processing block execute the drawing processing and, if the workload is in excess of a predetermined level, makes the second drawing processing block execute the drawing processing; if an application read from the storage block is of the fourth category, the control block measures a workload in the second drawing processing block and, if the workload is below a predetermined level, makes the second drawing processing block execute the drawing processing and, if the workload is in excess of a predetermined level, makes the first drawing processing block execute the drawing processing; and, if an application read from the storage block is of the fifth category, the control block measures workloads in the first drawing processing block and the second drawing processing block and makes the drawing processing block having a lower workload execute the drawing processing.

(10) The information processing apparatus according to (8) or (9) above, wherein the dividing of the application into one of the first category through the fifth category is executed, on the basis of results of measurement and evaluation of processing power and power dissipation of each of the first drawing processing block and the second drawing processing block obtained if the application has been executed in the first drawing processing block and the second drawing processing block.

(11) An information processing method including:
storing an application;
measuring at least one of a workload of a first drawing processing block configured to generate a video signal by executing predetermined signal processing on entered video data and a workload in a second drawing processing block configured to generate a video signal by executing predetermined signal processing on entered video data, the second drawing processing block having a higher drawing processing power than that of the first drawing processing block; and,
selecting, if the application requires drawing processing by at least one of the first drawing processing block and the second drawing processing block, any one of the first drawing processing block and the second drawing processing block as the drawing processing block on which the application read from the storage is executed, on the basis of information about at least one of the measured workload in the first drawing processing block and the measured workload in the second drawing processing block.

The present disclosure contains subject matter related to that disclosed in Japanese Priority Patent Application JP 2011-129191 filed in the Japan Patent Office on Jun. 9, 2011, the entire content of which is hereby incorporated by reference.

It should be understood by those skilled in the art that various modifications, combinations, sub-combinations and alternations may occur depending on design requirements and other factors insofar as they are within the scope of the appended claims or the equivalent thereof.

What is claimed is:
1. An information processing apparatus comprising:
a first drawing processing block configured to generate a first video signal by executing predetermined signal processing on entered image data;
a second drawing processing block having a higher drawing processing power than a drawing processing power of said first drawing processing block, said second drawing processing block being configured to generate a second video signal by executing predetermined signal processing on the entered image data;
a workload measuring block configured to measure at least one of a first workload in said first drawing processing block and a second workload in said second drawing processing block;
a storage block configured to store an application; and
a control block configured to select, if said application read from said storage block requires drawing processing by at least one of said first drawing processing block and said second drawing processing block, any one of said first drawing processing block and said second drawing processing block as a drawing processing block on which said application read from said storage block is executed, on the basis of information about at least one of the first workload in said first drawing processing block measured by said workload measuring block and the second workload in said second drawing processing block measured by said workload measuring block, wherein if a power dissipation of said information processing apparatus is found necessary to be held low, then said control block makes said first drawing processing block execute drawing processing on said application read from said storage block, and limits an operation clock frequency of said first drawing processing block to a level below a predetermined frequency.

2. The information processing apparatus according to claim 1, wherein, of said first drawing processing block and said second drawing processing block, said control block selects the drawing processing block lower in the first workload and the second workload measured by said workload measuring block as the drawing processing block on which said application read from said storage block is executed.

3. The information processing apparatus according to claim 1, wherein
said control block determines that the power dissipation of said information processing apparatus is necessary to be held low in one of situations where said information processing apparatus is powered by a secondary battery incorporated in said information processing apparatus and a power save mode for saving the power dissipation of said information processing apparatus is set.

4. The information processing apparatus according to claim 3, wherein
said workload measuring block determines a magnitude of said first workload and second workload, by at least one of a magnitude of power dissipation of each of said first drawing processing block and said second drawing processing block and a magnitude of a chip junction plane temperature of a semiconductor device, wherein the semiconductor device constitutes each of said first drawing processing block and said second drawing processing block.

5. The information processing apparatus according to claim 4, wherein,
if one of said first workload and said second workload measured by said workload measuring block has reached a preset upper limit, the control block outputs at least one of a message prompting termination of said application with which drawing is being executed by at least one of said first drawing processing block and said second drawing processing block, and a message prompting deferment of new execution of said application.

6. An information processing apparatus comprising:
a first drawing processing block configured to generate a first video signal by executing predetermined signal processing on entered image data;
a second drawing processing block having a higher drawing processing power than a drawing processing power of said first drawing processing block, said second drawing processing block being configured to generate a second video signal by executing predetermined signal processing on the entered image data;
a workload measuring block configured to measure at least one of a first workload in said first drawing processing block and a second workload in said second drawing processing block;
a storage block configured to store a plurality of applications; and
a control block configured to select, if an application of said plurality of applications, read from said storage block, requires drawing processing by at least one of said first drawing processing block and said second drawing processing block, any one of said first drawing processing block and said second drawing processing block as a drawing processing block on which said application read from said storage block is executed, on the basis of information about at least one of the first workload in said first drawing processing block and the second workload in said second drawing processing block measured by said workload measuring block, wherein said plurality of applications stored in said storage block are divided into a first category in which drawing processing is always executed by predetermined one of said first drawing processing block and said second drawing processing block, and a second category in which drawing is executed by one of said first drawing processing block and said second drawing processing block, and if said application read from said storage block is of said second category, then the control block selects one of said first drawing processing block and said second drawing processing block on which to execute said application.

7. The information processing apparatus according to claim 6, wherein
said second category includes a third category in which drawing processing is executed desirably on said first drawing processing block, a fourth category in which drawing processing is executed desirably on said second drawing processing block, and a fifth category in which drawing processing may be executed on any one of said first drawing processing block and said second drawing processing block.

8. The information processing apparatus according to claim 7, wherein,
if an application read from said storage block is of said third category, the control block measures said first workload in said first drawing processing block and, if said first workload is below a predetermined level, makes said first drawing processing block execute said drawing processing and, if said first workload is in excess of a predetermined level, makes said second drawing processing block execute said drawing processing;
if an application read from said storage block is of said fourth category, said control block measures said second workload in said second drawing processing block and, if said second workload is below a predetermined level, makes said second drawing processing block execute said drawing processing and, if said second workload is in excess of a predetermined level, makes said first drawing processing block execute said drawing processing; and,
if an application read from said storage block is of said fifth category, said control block measures said first workload of said first drawing processing block and said second workload of said second drawing processing block and makes the drawing processing block having a lower workload execute said drawing processing.

9. The information processing apparatus according to claim 7, wherein
the dividing of said plurality of applications into one of said first category, said second category, said third category, said fourth category, and said fifth category, is executed, on the basis of results of measurement and evaluation of processing power and power dissipation of each of said first drawing processing block and said second drawing processing block obtained if said application has been executed in said first drawing processing block and said second drawing processing block.

10. An information processing method comprising:

storing a plurality of applications;

measuring at least one of a first workload of a first drawing processing block configured to generate a first video signal by executing predetermined signal processing on entered video data and a second workload of a second drawing processing block configured to generate a second video signal by executing predetermined signal processing on entered video data, said second drawing processing block having a higher drawing processing power than that of said first drawing processing block; and selecting, if said application requires drawing processing by at least one of said first drawing processing block and said second drawing processing block, any one of said first drawing processing block and said second drawing processing block as a drawing processing block on which said application read from said storage is executed, on the basis of information about at least one of the measured first workload in said first drawing processing block and the measured second workload in said second drawing processing block, wherein said stored plurality of applications are divided into a first category in which drawing processing is always executed by predetermined one of said first drawing processing block and said second drawing processing block, and a second category in which drawing is executed by one of said first drawing processing block and said second drawing processing block, and wherein if an application read from said stored plurality of applications is of said second category, then one of said first drawing processing block and said second drawing processing block is selected for executing said application.

* * * * *